United States Patent

[11] 3,583,274

[72] Inventor William B. Duffy
 Berkeley Heights, N.J.
[21] Appl. No. 823,692
[22] Filed May 12, 1969
[45] Patented June 8, 1971
[73] Assignee United-Carr Incorporated
 Boston, Mass.

[54] SHEET-METAL MEMBER AND A FASTENING SCREW
 8 Claims, 7 Drawing Figs.

[52] U.S. Cl. .................................................... 85/32
[51] Int. Cl. .................................................. F16b 37/02
[50] Field of Search............................................ 151/14,
 14.5, 30, 22, 21 A, 21 B, 21 C, 41.75; 85/32

[56] References Cited
 UNITED STATES PATENTS
 1,885,459 11/1932 McDonnell.................. 151/21B
 2,381,352 8/1945 Hotchkin..................... 151/14
 2,777,495 1/1957 Pavlinetz..................... 85/32
 3,003,533 10/1961 Hubbard ..................... 151/21B
 3,362,279 1/1968 Miller............................ 85/32 Int.
 3,388,732 6/1968 Holton ......................... 151/21C
 FOREIGN PATENTS
 224,375 10/1959 Australia...................... 85/32
 935,616 8/1963 Great Britain................ 151/41.75
 40,296 7/1965 Germany...................... 151/41.75

Primary Examiner—Marion Parsons, Jr.
Attorney—Charles F. Chisholm

ABSTRACT: A sheet-metal member includes an open-bottom socket formed from the sheet metal. The sheet metal extends inwardly at the bottom of the socket and is formed into a female thread for receiving a fastening screw. A little below the top of the socket three equally spaced projections, formed from the sheet metal, extend inwardly and frictionally engage the thread of the screw.

PATENTED JUN 8 1971 3,583,274

INVENTOR.
WILLIAM B. DUFFY
BY
Charles F. Chisholm
ATTORNEY

SHEET-METAL MEMBER AND A FASTENING SCREW

Broadly the field is the fastening together of first and second members by means of a screw, the first member being of sheet metal and being formed with a female thread that receives the screw. The second member may be, for example, an electrical conductor that is fastened to the first member by the screw. As another example, the second member may be a support, of sheet metal or otherwise, to which the first member is fastened by the screw. The invention is well suited for use under severe space limitations, where only a small screw can be used and space that is available annularly of the screw is severely limited. The invention is also well suited for use where, preliminary to the fastening together of the two members, the screw is to be held captive to the first member with the screw in started position. The invention is also well suited for use where, after the fastening together of the two members, there is need for special means to hold the tightened-down screw against loosening.

The first member, which is of sheet metal, includes an open-bottom socket formed from the sheet metal. The sheet metal extends inwardly at the bottom of the socket and is formed into a female thread for receiving and mating with a fastening screw that is inserted lengthwise into the socket. The screw is entered through the mouth of the socket or, in some instances, through the bottom of the socket. Protuberances, which are formed from the sheet metal, extend inwardly of the socket. These protuberances are spaced axially from the female thread and are spaced circumferentially about the axis of the female thread; they extend far enough toward the axis of the female thread to be frictionally engaged by the screw. The protuberances are resiliently displaced outwardly by the screw to at least some extent, and collectively they grip the screw by resilient reaction. As the screw is rotated in contact with the protuberances, the thread of the screw wipes against the protuberances and thereby the crest diameter of the screw is reduced to at least some extent in the usual case. Such reduction in the crest diameter of the screw taken with the outward displacement of the protuberances compensates for manufacturing variations in the crest diameter of the screw and in the initial distance of the protuberances from the axis of the female thread.

FIG. 1 is a sectional elevation, larger than actual size, showing as a first embodiment how the invention may be used for fastening a conductor to a sheet-metal electrical terminal. Such sectional showing as the figure contains is on the line 1–1 of FIG. 2. The threads of the screws are shown diagrammatically.

FIG. 2 is a view looking down on FIG. 1 but with the left-hand fastening screw of FIG. 1 omitted.

FIG. 3 is a detail view to a larger scale than FIGS. 1 and 2. The left-hand screw-receiving socket of FIGS. 1 and 2 is shown in section, taken on line 3–3 of FIG. 2. The left-hand fastening screw of FIG. 1 is shown in elevation, in started position. For convenience of illustration the visible portions of the helical lines of the screw thread are represented by straight lines.

Figure 1:
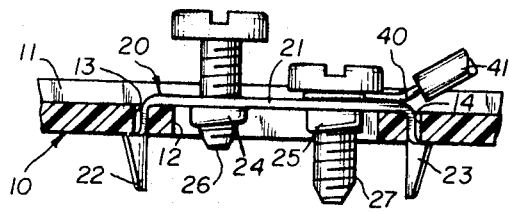

Except as may be otherwise indicated, the description hereinafter refers to the particular forms of the invention that are shown in the drawings and does not necessarily refer to any other form or forms in which the invention may be embodied. The claims, however, embrace other forms in which the invention may be embodied. The best modes thus far contemplated of carrying out the invention are herein disclosed. Nevertheless, the disclosure is by way of illustration and example. Other specific modes are possible, and it is left to the user to dispense with any feature of the invention which may not be needed for his particular purpose.

The invention will be referred to on the basis of the axes of the screw and socket being vertical and the mouth of the socket being at the top, this basis of reference being for clarity an convenience only. The invention may, of course, be used in any oriented position; the socket will be bottom-side up in some instances, and in other instances the axes of the screw and socket will be horizontal or in some inclined position.

Figure 2:
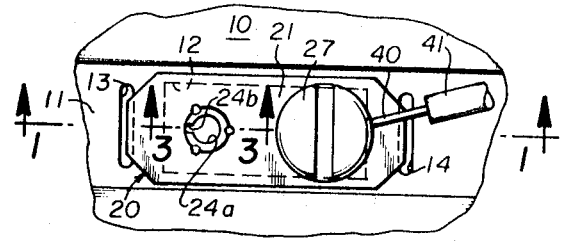

In FIGS. 1 and 2 there is a base or support 10 of firm but yieldable plastic. This base is formed with a channel 11; and it is provided with a cutout 12 which is aligned with the channel, being somewhat narrower than the channel. Spaced from the ends of the cutout 12 the base has slots 13 and 14 which extend from the bottom of the channel 11 to the under side of the base 10.

Mounted in the base 10 there is an electrical terminal 20 that is formed in one piece of sheet metal. This terminal has a straplike body-portion 21 which is nested within the channel 11 and overlies the cutout 12. At the ends of the body portions 21, and extending perpendicularly therefrom, the terminal has barbed fingers 22 and 23. The fingers 22 and 23 are forced through the slots 13 and 14 respectively of the yieldable plastic base 10 and serve to secure the terminal 20 in mounted position in the plastic base.

Formed from the sheet metal of the terminal 20 and extending downwardly from the body 21 there are open-bottom screw-receiving sockets 24 and 25. The sheet metal at the bottom of the socket 24 extends inwardly and is formed into a female thread 24a (FIGS. 2 and 3) which extends through 360° except for the notch 24b that affords entry of the thread of the screw. The notch 24b is toward the finger 22 (FIG. 1). The sheet metal at the bottom of the socket 25 extends inwardly and is formed into a female thread 25a (FIGS. 4 and 5) having a notch 25b that is toward the finger 23 (FIG. 1) and affords entry of the thread of the screw. Sockets 24 and 25 are duplicates, though displaced 180° about their axes.

The sockets 24 and 25 are each provided with three protuberances P, all six of which are alike. The three protuberances of each socket are equally distributed circumferentially about the axis of the female thread. The three protuberances are at the same level, and they are spaced upwardly from the female thread; see FIG. 5. As viewed looking down into the socket, each protuberance may have a concave nose $P^1$, as will be explained. When making the socket (24 or 25), it is formed except for the protuberances and then the protuberances are formed from the metal of the sheet-metal member 20. IN forming the three protuberances of a socket, metal from the thickness of the sheet metal is displaced in a direction transverse to the thickness of the sheet metal, being punched downwardly from the top of the socket by a punch that has three punching faces which are alike and which are 120° apart center to center. The metal flows and in so doing bulges toward the common axis of the socket and female thread, forming the three protuberances P of the socket. The punch may have a central cylindrical mandrel that is in advance of the punching faces and is coaxial with the common axis of the socket and female thread. The mandrel may be used to establish the nominal distance of the protuberances from the axis of the female thread, the displaced metal being forced against the cylindrical wall of the mandrel and thereby giving the three protuberances noses $P^1$ which are concave as viewed in FIG. 4 and which are at the same nominal distance from the axis of the female thread. The punching faces of the punch give the protuberances P flat tops $P^2$ which lie in a common plane that is perpendicular to the common axis of the socket and female thread, each top $P^2$ being at the bottom of a vertical channel $P^3$ left by the punch, and each channel having flat diverging sides $P^4$, $P^4$.

Figure 4:
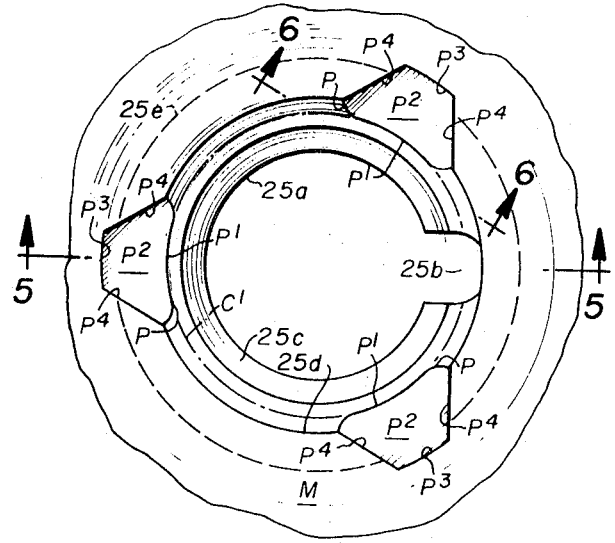
FIG. 4 is a fragmentary plan view, to a still larger scale than FIG. 3, looking down into the socket which receives the right-hand screw of FIG. 1.
Figure 5:
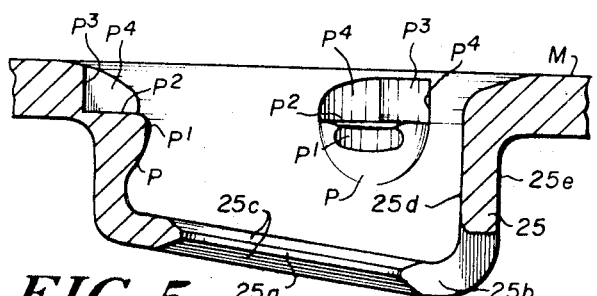
FIG. 5 is a fragmentary sectional view taken on the line 5–5 of FIG. 4
Figure 6:
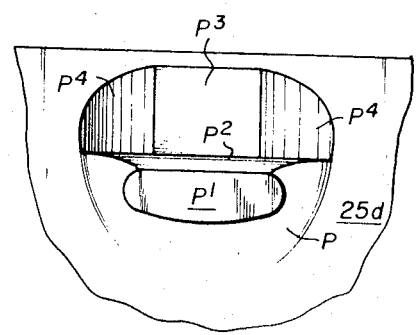
FIG. 6 is a detail view showing in elevation one of the protuberances that is engaged by the screw. The view is on the line 6–6 of FIG. 4 and is to approximately twice the scale of FIG. 4.

In FIG. 5 the protuberance P which is at the left is cut centrally by the vertical plane which includes the axis of the female thread; it will be seen that the protuberance has a curved line of intersection with such plane from the inner of the cylindrical walls 25d and 25e of the socket 25 to the bottom of the concave nose P¹. Center to center, the three protuberances of each socket are 120° apart circumferentially. However, each protuberance extends circumferentially through an angle which is only a minor part of 120°, the circumferential extent of each protuberance being approximately 45° in FIG. 4 of the drawing. The protuberances extend far enough toward the axis of the female thread to be frictionally engaged by the fastening screw when the screw is in mating relation with the female thread, the inwardly extending nose P¹ of each protuberance being markedly engaged by the crest C of the screw thread (FIG. 3), as is indicated generally by the circle C¹ in FIG. 4.

The manufacturing tolerances are so chosen that protuberances lying at the greatest actual distance from the axis of the female thread will be engaged and be displaced outwardly to a very slight extent by the screw of the smallest actual crest diameter. The construction affords adjustment to accommodate manufacturing variations—variations whereby some sockets of the same nominal dimensions will have the protuberances at somewhat less actual distances from the axis of the female thread, and some screws of the same nominal size will have somewhat larger actual crest diameters. Accommodation of such manufacturing variations requires that the crest diameter of the screw be diminished by its engagement with the protuberances and/or that the screw displace the protuberances outwardly to an increased extent. As the screw is rotated in engagement with the protuberances, the crest C of the screw is wiped against the protuberances. The wiping action can push the crest of the screw back somewhat, thereby diminishing the crest diameter of the screw. At the same time the outward pressure of the screw on the protuberances displaces the protuberances resiliently outward to an increased extent if necessary to the axial movement of the screw past the protuberances. This is not a spring-finger action, as the protuberances themselves are substantially inflexible and the wall of the socket is circumferentially continuous. Nevertheless, the protuberances can be forced outwardly by the screw to the needed extent because the protuberances are circumferentially separated by relatively long arcs of the socket wall; as the protuberances are forced outwardly the two ends of each arc can be pulled apart a trifle, the curvature of the arc decreasing slightly.

Referring to FIGS. 1 and 2, the electrical terminal 20 constitutes the first member; this is of sheet metal and includes an open-bottom socket (24 and also 25) made from the sheet metal. A conventional screw 26, inserted through the mouth of socket 24, is in mating relationship with the female thread 24a (FIG. 3) at the bottom of the socket, screw 26 being in started position. Socket 25 is provided with a screw 27 which is a duplicate of the screw 26. The screw 27 mates with the female thread 25a (FIGS. 4 and 5) at the bottom of socket 25. The screw 27 is in tightened-down position and is shown securing a second member to the terminal 20, the second member being an electrical conductor 40 having insulation 41. Each screw is somewhat smaller than its socket, i.e. the crest diameter of the screw is somewhat less than the internal diameter of the socket except for the protuberances P. The axis of each screw, when mated with the female thread, coincides with the axis of the female thread.

Figure 3:
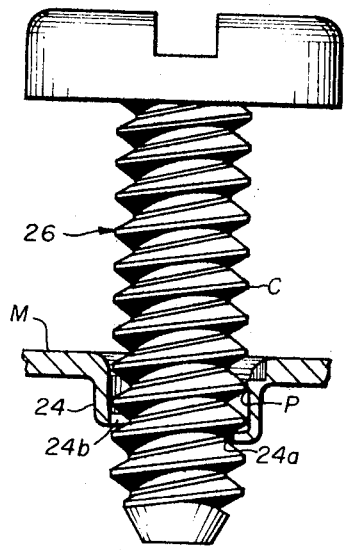

As is seen in FIG. 3, and better seen in FIG. 5, the sheet-metal female thread is beveled both top and bottom. In FIG. 5 each of the bevels is designated by 25c. The beveling enables the female thread to extend farther toward the axis of the screw and thereby effect adequate entry between adjacent convolutions of the screw thread even when the sheet metal is relatively thick as compared to the distance between adjacent convolutions of the screw thread.

Upon being inserted, the fastening screw (26 or 27) firmly engages the three protuberances P; thereby the screw is held against fortuitous rotation when it is in any adjusted position. When the screw is in the started position shown for screw 26 in FIGS. 1 and 3 it is held captive against accidental disengagement. Thus the protruding end of the screw need not be distorted or upset to hold the screw captive to the first member while a first member is being shipped or handled. In some instances the fastening screw may be inserted through the bottom of the socket instead of the mouth of the socket; in started position the leading end of the screw will engage the protuberances P and be held captive and, when tightened down, the screw will be held against fortuitous loosening.

Figure 7:
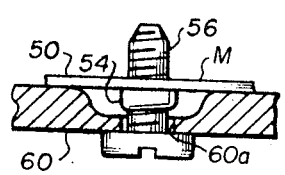
FIG. 7 is a fragmentary sectional elevation, to approximately the same scale of FIGS. 1 and 2, showing a second embodiment of the invention, in which a sheet-metal member is attached to a support with a fastening screw. The thread of the screw is shown diagrammatically.

In FIG. 7 the second member is beneath the socket and may be a support to which the first member is fastened. The first member 50 is of sheet metal and includes a socket 54 which is the same as the socket 24 (FIGS. 1 and 3). Beneath the first member 50 there is a second member 60, which may be a support to which the member 50 is to be fastened. A screw 56, which is the same as the screws 26 and 27 (FIG. 1), passes loosely through a hole 60a in the member 60, mates with the female thread at the bottom of the socket, and extends out of the top of the socket.

In the forms of the invention that are shown the screw-receiving socket has a cylindrical wall which extends perpendicularly from the general plane of the sheet metal M that surrounds the mouth of the socket. The sheet metal is of suitable thickness and has such characteristics as are suitable for the particular use to which the invention is to be put. If the first member is an electrical terminal the sheet metal may be of spring brass. However, with good area of contact, spring steel may be used for electrical terminals. In general, it is presently preferred to make the first member (e.g. member 20 or member 50) of annealed spring steel which is hardened and tempered after forming and then plated with corrosion-resistant metal, for example, cadmium. Sheet spring-steel 0.020" thick is contemplated.

Suitable screws, purchased on the market, are used. For electrical connections brass screws may be used; mild steel screws may be used also. In general it is presently preferred for all purposes to use mild steel screws which are plated with rust-resistant metal, for example, cadmium.

Even in small sizes the construction affords adequate adjustment to accommodate expected manufacturing variations in size. A size 4–40 screw may be used, and it may be an inexpensive rolled screw in which the actual crest diameter can be expected to vary by as much as 0.005", with a maximum actual crest diameter of approximately 0.110".

The socket is adapted to closely embrace even a small screw, and the construction affords adequate engagement of the female thread with the screw thread even when the socket is of sheet metal that is relatively thick. Thus the invention is well suited for use under severe space limitations. The fastening screw firmly engages the three protuberances and displaces them resiliently outwardly to at least some extent; by reaction the protuberances hold the screw against fortuitous rotation, e.g. fortuitous rotation in either direction when the screw is in started position and fortuitous reverse rotation after the screw has been tightened down.

I claim:

1. A sheet-metal member that includes an open-bottom socket formed from the sheet metal, the wall of the socket being an endless band of sheet metal which extends circumferentially of the socket axis with the thickness of the sheet metal disposed radially of the socket axis, the sheet metal extending inwardly at the bottom of the socket and being formed into a female thread for receiving and mating with a screw that is of smaller diameter than the socket and is disposed with its axis coincident with the axis of the female thread, a fastening screw to mate with the female thread, the crest diameter of the thread of the screw being somewhat less than the internal diameter of the socket—wherein the improvement comprises: protuberances which extend inwardly of the wall of the socket and which are located at the same level adjacent to the mouth of the socket, the protuberances being formed from the metal of the sheet-metal member by metal displaced from the thickness of the metal without cutting through the metal, the protuberances extending far enough toward the axis of the female thread to be frictionally engaged by the crest of the screw thread when the screw is in mating relation with the female thread, and the protuberances being spaced circumferentially about the axis of the female thread.

2. A sheet-metal member and fastening screw as in claim 1 but wherein the protuberances have inwardly extending noses at which the protuberances are engaged by the crest of the thread of the screw.

3. A sheet-metal member and fastening screw as in claim 2 but wherein each protuberance has a curved line of intersection with the plane that includes the axis of the female thread and the mid point on the protuberance.

4. A sheet-metal member and fastening screw as in claim 1 but wherein the protuberances are three in number and are equally distributed circumferentially about the axis of the female thread.

5. A sheet-metal member and fastening screw as in claim 1 but wherein the protuberances are formed of metal taken from adjacent to the top of the socket and displaced toward the bottom of the socket.

6. A sheet-metal member and fastening screw as in claim 5 but wherein the protuberances are three in number and are equally distributed circumferentially about the axis of the female thread.

7. A sheet-metal member and fastening screw as in claim 6 but wherein each protuberance extends circumferentially of the socket through an angle which is only a minor part of 120° and, as viewed looking down into the socket, has a nose which is concave toward the axis of the socket.

8. A sheet-metal member and fastening screw as in claim 1 but wherein the female thread is beveled to enable the female thread to extend farther toward the axis of the screw and thereby afford adequate entry between adjacent convolutions of the screw thread even when the sheet metal is relatively thick as compared to the distance between adjacent convolutions of the screw thread.